United States Patent [19]

Maeda et al.

[11] 4,112,442
[45] Sep. 5, 1978

[54] CAMERAS WITH ELECTRICALLY CONTROLLED EXPOSURE FOR USE WITH ELECTRONIC FLASH DEVICE

[75] Inventors: Keisuke Maeda, Osaka; Seiji Yamada, Sakai, both of Japan

[73] Assignee: Minolta Camera Kabushiki Kaisha, Osaka, Japan

[21] Appl. No.: 742,427

[22] Filed: Nov. 17, 1976

[30] Foreign Application Priority Data

Dec. 4, 1975 [JP] Japan .................. 50-145357

[51] Int. Cl.$^2$ .............................................. G03B 15/05
[52] U.S. Cl. .......................................... 354/31; 354/33; 354/128
[58] Field of Search ............................ 354/27, 32–35, 354/60 F, 139, 145, 149, 31, 53, 60 L, 127, 128

[56] References Cited

U.S. PATENT DOCUMENTS

| | | | |
|---|---|---|---|
| 3,690,237 | 9/1972 | Fuwa | 354/139 X |
| 3,978,496 | 8/1976 | Matsumoto | 354/33 |
| 4,016,575 | 4/1977 | Uchiyama et al. | 354/33 |

*Primary Examiner*—L. T. Hix
*Assistant Examiner*—William B. Perkey
*Attorney, Agent, or Firm*—Watson, Cole, Grindle & Watson

[57] ABSTRACT

A camera having an electrically controlled exposure is capable of mounting thereon or incorporating therein an electronic flash device which includes a flash tube, a main capacitor for firing the flash tube and a trigger circuit having a trigger capacitor. To initiate the flashing of the flash tube, the trigger capacitor, which has been charged to a voltage level corresponding to that across the main capacitor, is discharged in synchronism with the opening of a shutter through a firing circuit which is made conductive only when the brightness of an object is lower than a predetermined level. A first transistor is made conductive upon the opening of the shutter only when the brightness of the object is lower than the predetermined level and a second transistor is connected in series with the first transistor and made conductive only when the trigger capacitor is charged up to a sufficient level. The series connection of the first and second transistors is in turn connected to a time constant circuit consisting of a timing capacitor and a photoconductive element for detecting the brightness of the object. The timing capacitor is rapidly charged or discharged to a predetermined level when both the first and second transistors are made conductive, so that an exposure control circuit connected to the timing capacitor generates a signal for terminating an exposure soon after the flashing of the flash tube.

9 Claims, 2 Drawing Figures

CAMERAS WITH ELECTRICALLY CONTROLLED EXPOSURE FOR USE WITH ELECTRONIC FLASH DEVICE

BACKGROUND OF THE INVENTION

The present invention relates to an electrically controlled exposure for a camera which incorporates therein, or is capable of mounting thereon, an electronic flash device.

Hitherto, for example in U.S. Pat. No. 3,535,989 and U.S. Pat. No. 3,535,991, an electrically controlled exposure in a camera of the type, which is prepared for flash photography when the brightness of an object is lower than a predetermined level and for day-light photography with automatic exposure control when the brightness of the object is higher than the predetermined level, is well known. For the selection of the flash photography and the day-light photography, the conventional cameras are provided with mechanical switching means coupled with an electromagnet which is actuated depending on the output of a brightness detecting circuit. However, such mechanical switching means has a complex construction, which increases their cost of manufacturing. Moreover, for flash photography, a specific shutter speed is always selected to ensure synchronization between the exposure and the flashing of the flash tube. However, the selection of the specific shutter speed will result in an under-exposure due to an insufficient amount of light emitted from the flash tube if the shutter is erroneously released when the main capacitor of the flash device has not been charged up to a level for firing the flash tube to emit a sufficient amount of light.

SUMMARY OF THE INVENTION

Accordingly, it is an object of the present invention to provide an electrically controlled exposure camera which can automatically select day-light photography with automatic exposure control and flash photography, depending upon the brightness of an object, and which requires no mechanical switching means for such selection.

Another object of the present invention is to provide an electrically controlled exposure for a camera of the above described type in which, for flash photography, an exposure is automatically terminated immediately after the flashing of an electronic flash device to ensure synchronization between the exposure and the flashing of the flash tube.

Still another object of the present invention is to provide an electrically controlled exposure for a camera of the above described type which can detect whether the electronic flash device has been completely prepared for firing the flash tube and in which an exposure is automatically controlled depending upon the brightness detecting means output to avoid an under-exposure if the electronic flash device has not been completely prepared for firing the flash tube even when the brightness of the object is lower than the predetermined level.

To accomplish these objects in accordance with the present invention, there are provided brightness detecting means which generates an output commensurate with the brightness of an object, a timing capacitor connected to the brightness detecting means so as to integrate a first current commensurate with the output of the brightness detecting means, means for initiating the integration upon commencement of an exposure, and an exposure control circuit which terminates the exposure when the voltage across the timing capacitor reaches a predetermined level, as is well known in conventional electrically controlled exposure cameras. According to the present invention, there are further provided a firing circuit, a current supplying circuit, and means for permitting the actuation of the firing circuit and the current supplying circuit upon an exposure. The firing circuit is responsive to the output of the brightness detecting means and actuated upon an exposure to initiate the firing of a flash tube of an electronic flash device when the brightness of the object is lower than a predetermined level. The current supplying circuit includes first switching means responsive to the output of the brightness detecting means and is conductive only when the brightness of the object is lower than the predetermined level. When the first switching means is conductive, the current supplying circuit is actuated upon exposure to supply a second current to the timing capacitor. The second current is such that the voltage across the timing capacitor reaches the predetermined level soon after the flashing of the flash tube, so that the exposure is terminated soon after the flashing of the flash tube, whereby the synchronization between the exposure and the flashing of the flash tube is ensured. When the first switching means remains nonconductive due to the high brightness of the object, the current supplying circuit remains inactive even upon an exposure, so that the exposure is automatically controlled in accordance with the brightness of the object, whereby day-light photography with automatic exposure control is effected.

According to preferred embodiments of the present invention, there are further provided flashing preparation detecting means for detecting whether the electronic flash device has been completely prepared for firing the flash tube. Also, the current supplying circuit further includes second switching means connected to the flashing preparation detecting means so as to be conductive only when the flash device has been completely prepared for firing the flash tube. The second switching means is also connected in series to the first switching means, so that the current supplying circuit is switched to an active condition when both the first and second switching means are conductive. When the brightness of the object is lower than the predetermined level and when the flash device has been completely prepared for firing the flash tube, the flash tube is fired and the current supplying circuit is actuated upon an exposure. Thus, the exposure is terminated soon after the exposure. When the brightness of the object is lower than the predetermined level, but when the flash device has not been completely prepared for firing the flash tube, the flash tube is fired emitting an insufficient amount of light and the current supplying circuit remains inactive upon an exposure. Thus, the timing capacitor is supplied with only the first current commensurate with the brightness of the object which is illuminated by the light emitting from the flash tube, whereby a proper exposure is effected.

The current supplying circuit is formed as a charging circuit for the timing capacitor is a first embodiment and as a discharging circuit for the timing capacitor in a second embodiment. In other words, in the first embodiment, the second current to be integrated has a positive value, so that the voltage across the timing capacitor rises with the integration of the second current, whereas in the second embodiment, the second current to be integrated has a negative value, so that the voltage across the timing capacitor falls with the integration of the second current.

The above and other objects and features of the present invention will become more apparent from a reading of the following description taken in connection with the accompanying drawings.

DESCRIPTION OF THE PREFERRED EMBODIMENTS

Figure 1:
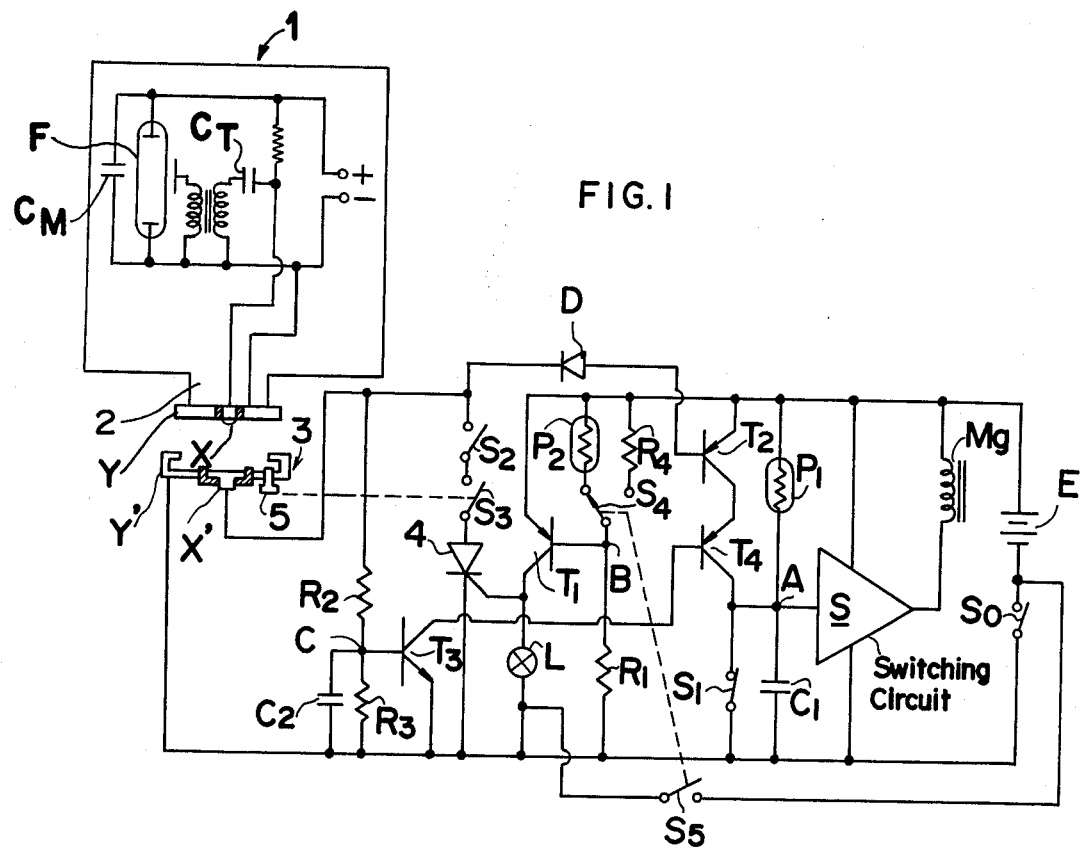
FIG. 1 is a diagram of an electric circuit according to a first embodiment of the present invention.

Referring first to FIG. 1 showing a first embodiment of the present invention, CdS cell P1 is mounted within the body of a camera (not shown) for receiving light from an object, and timing condenser C1 and the CdS cell are connected in series with each other, thereby constituting a time constant circuit. Potential source switch S0 is adapted to be turned on in the initial stage of the shutter releasing operation. Switch S1 is adapted to be turned off simultaneously with commencement of release of a known shutter (not shown). When switch S1 is turned off after the closure of switch S0, current will flow from battery E through CdS cell P1, thereby charging capacitor C1. Switching circuit S and electromagnet Mg for locking a shutter closing member (not shown) are well-known elements. When switch S0 is turned on, a low level output is produced at an output terminal of the switching circuit S, thereby exciting electromagnet Mg. As the charging of capacitor C1 proceeds, when the potential at point A is raised to a given level, then the level of the output of switching circuit S is raised, whereby electromagnet Mg is deenergized, thereby releasing the shutter closing member from its locked position, and closing the shutter.

A known electronic flash device 1 having a flash tube F has a main capacitor CM in which the electric charge to fire the flash tube is stored and a trigger circuit for initiating the firing of the flash tube, as for example shown in U.S. Pat. No. 3,517,255. The trigger circuit includes a trigger capacitor CT connected to the main capacitor so as to be charged to a voltage level corresponding to that across the main capacitor. The flash device is mounted on the body of a camera by inserting foot 2 in connector 3 provided in the camera body. Contacts X and Y are attached to foot 2, which contacts are connected to the opposite terminals of the trigger capacitor provided in a trigger circuit included in flash device 1. Contacts X and Y are brought into contact with contacts X' and Y' attached to connector 3, when flash device 1 is mounted on the camera body, with its foot 2 fitted into connector 3. CdS cell P2 is mounted within the camera body for receiving light from an object, like CdS cell P1. Fixed resistor R1 is connected by change-over switch S4 to one end of CdS cell P2, and the base of transistor T1 is connected to junction B between the CdS cell and resistor R1. Warning lamp L and the gate of SCR (silicon controlled rectifier) 4 are connected to the collector of transistor T1. When the potential at point B becomes lower than a predetermined level and transistor T1 becomes conductive thereby opening, the gate of SCR 4 and open lighting warning lamp L. SCR 4 is connected to battery E in series through synchronous switch S2, switch S3 for detecting that the flash device has been mounted on the camera, diode D and transistor T2. When transistor T1 becomes conductive and switches S2 and S3 are both turned on, SCR 4 becomes conductive, thereby rendering transistor T2 conductive. Switch S2 is turned on when the shutter is fully opened, while switch S3 is turned on by switch button 5 which is depressed by foot 2 when it is mounted in connector 3. Diode D is provided for isolating transistor T2 from the terminal voltage of the trigger capacitor included in the trigger circuit within flash device 1.

Fixed resistors R2 and R3 are connected in series with each other between the aforesaid two contacts X' and Y', and divide the terminal voltage of the capacitor in the trigger circuit within flash device 1, the aforesaid terminal voltage being impressed across contacts X' and Y'. The base of transistor T3 is connected to junction C between resistors R2 and R3. Capacitor C2 is connected across resistor R3. A resistance ratio between these two resistors R2 and R3 is determined to render transistor T3 conductive, upon completion of the charging of the trigger capacitor within flash device 1. The collector of transistor T3 is connected to the base of transistor T4, so that if transistor T3 becomes conductive, transistor T4 will also be conductive.

Transistors T2 and T4 are collector-emitter-connected to each other, and the collector of transistor T4 is connected to point A. Because of the collector-emitter connection between both transistors, current is allowed to flow from the emitter of transistor T2 to the collector of transistor T4, only when both of the transistors T2 and T4 are conductive, and collector current flows through point A to capacitor C1 for charging it, when switch S1 is turned off.

Battery check switches S4 and S5 are readily accessible from the exterior of the camera body. If switch S4 is changed over to contact resistor R4 and switch S5 is turned on, then a partial or divided voltage from battery E will be obtained at point B. Should the potential at point B be lower than a given level because of the degeneration of battery E, then transistor T1 becomes conductive, thereby lighting warning lamp L.

In operation, when flash device 1 is mounted on the camera, with foot portion 2 fitted into connector 3, then switch S3 will be closed by switch button 5, and contacts X and Y of flash device 1 will be brought into contact with contacts X' and Y' of the connector, whereby the terminal voltage of the trigger capacitor in the trigger circuit within flash device 1 will be impressed across the terminals of resistors R2 and R3. When the charging of the trigger capacitor included in the trigger circuit is completed, the potential at point C is raised to a given level, so that transistor T3 will be made conductive, whereby transistor T4 also becomes conductive.

When the shutter is released, then potential source switch S0 is first turned on, whereby electromagnet Mg is excited, thereby locking the shutter closing member (not shown), the foregoing operations being performed by mechanism well known to those skilled in the art. The potential at point B is dependent upon the brightness of the object. In the case where the brightness of an object is low, transistor T1 becomes conductive, thereby lighting warning lamp L, and the gate of SCR 4 is opened. With the progress of the shutter release operation, the shutter will be opened and exposure will start. Simultaneously with commencement of exposure, switch S1 is turned off, so that capacitor C1 is charged with current flowing through CdS cell P1. When the shutter is moved to its fully open position, then switch S2 is turned on in synchronism with the aforesaid movement of the shutter. At this time, in the case where switch S3 is maintained closed as previously described, SCR 4 becomes conductive, thereby making transistor T2 conductive, and the trigger capacitor in the trigger circuit in the flash device discharges through switches S2 and S3 and SCR 4, whereby the flash tube emits flash light.

Thus, when the brightness of an object is low, and the charging of the trigger capacitor in the trigger circuit in the flash device 1 fitted in connector 3 is completed, then transistors T2 and T4 become conductive in synchronism with the movement of the shutter to the fully open position, whereby capacitor C1 is charged with the current from the battery E, by way of these transistors. Consequently, the potential at point A will be rapidly raised to a given level and the level of the output of switching circuit S is raised thereby deenergizing electromagnet Mg, whereby the shutter is closed. This is the case where the exposure is terminated within a short period of time after emission of flash light from the flash tube of flash device 1, independently of the brightness of an object.

In contrast thereto, where the charging of the capacitor in the trigger circuit in flash device 1 is not yet completed, or where a camera is used, without mounting flash device 1 in connector 3, the potential at point C does not rise to the predetermined level. Accordingly, transistors T3 and T4 remain nonconducting, so that no current flows through transistors T2 and T4. Thus, capacitor C1 is charged with the current flowing through CdS cell P1 alone. In such cases, the exposure time is determined according to the resistance of CdS cell P1, namely, according to the brightness of an object.

Considering the fact that unless flash device 1 is mounted in connector 3, transistor T4 remains nonconducting, and switch S3 may be possibly omitted. Despite the above fact, the provision of switch S3 is advantageous in preventing premature depletion of the battery resulting from the flow of current from the emitter to the base of transistor T2, which is caused the moment switch S2 is turned on.

In case the brightness of an object is high, the potential at point B is raised, so that transistor T1 remains nonconducting, and hence SCR 4 and transistor T2 remain nonconducting. In such a case, irrespective of whether or not flash device 1 is mounted in connector 3, and regardless of the charge on the trigger capacitor in the trigger circuit within flash device 1, no current flows through transistors T2 and T4, whereas the exposure time is determined according to the brightness of an object. As SCR 4 remains nonconducting, flash device 1 is not fired when switch S is turned on.

Figure 2:
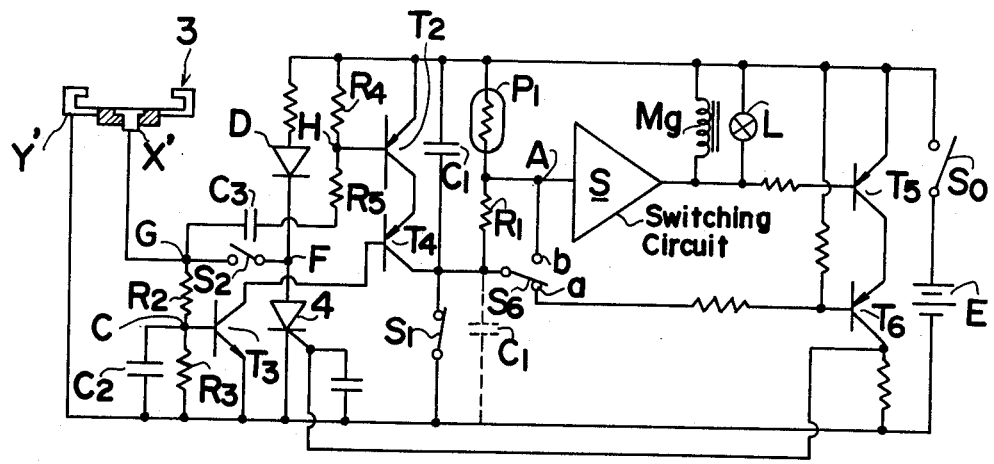
FIG. 2 is a diagram of an electric circuit according to a second embodiment of the present invention.

FIG. 2 shows a second embodiment wherein a single CdS cell P1 is used as a time constant circuit and also as a brightness detecting circuit. In this embodiment, time constant capacitor C1 is connected in parallel to CdS cell P1 and resistor R1, both of which are connected in series with each other, and transistors T2 and T4 are connected in series to timing capacitor C1. Changeover switch S6 is adapted to be connected to terminal b for short-circuiting resistor R1 in association with the shutter release operation. After switch S6 has been changed over into contact with terminal b, switch S1 is turned off, simultaneously with the commencement of the opening of the shutter. Thus, capacitor C1 is discharged through CdS cell P1 alone. Switching circuit S is the same as that shown in FIG. 1, which is arranged to produce a high output level when the potential at point A is higher than a predetermined level, and to produce a low output level when the potential at point A is lower than the predetermined level. Electromagnet Mg, warning lamp L and the base of transistor T5 are connected to the output of switching circuits. Only when the output of the switching circuit is low, electromagnet Mg is excited, lamp L is lit, and transistor T5 is made conductive. Transistor T6 is collector-emitter connected to transistor T5. The base of transistor T6 is connected to contact a of change-over switch S6 as well as to the positive terminal of battery E, and the collector thereof is connected to the gate of SCR 4 as well as to the negative terminal of battery E.

SCR 4 is connected through diode D to battery E and arranged to become conductive only when transistors T5 and T6 are both conducting. Connected in parallel to SCR 4 and diode D are voltage dividing resistors R4, R5, capacitor C3 and voltage dividing resistors R2, R3, which in turn are connected in series to one another. Synchroswitch S2 is connected between junction F of SCR 4 and diode D, and junction G of capacitor C3 and resistor R2. Synchroswitch S2 is turned on in synchronism with the movement of the shutter into its fully open position. The base of transistor T2 is connected to junction H of voltage dividing resistors R4 and R5. Transistor T2 becomes conductive when the potential at junction H is lowered to a predetermined level as a result of switch S2 being turned on. Voltage dividing resistors R2 and R3 are connected to contacts X' and Y' of connector 3, as in the preceding embodiment. The base of transistor T3 is connected to junction C of voltage dividing resistors R2 and R3. The collector of transistor T3 is connected to the base of transistor T4 so that when the potential at point C is raised and transistor T3 becomes conductive, transistor T4 will also be conductive.

In the initial stage of the shutter release operation, potential source switch S0 is turned on, whereby capacitor C1 is charged. If at that time, the brightness of an object is low, then a low output level will be produced from switching circuit S, thereby exciting electromagnet Mg, and lighting warning lamp L. In such a case, both transistors T5 and T6 become conductive and hence SCR 4 becomes conductive.

With the progress of the shutter release operation, change-over switch S6 is changed over to contact terminal b. Then, when the shutter is further moved to its open position, switch S1 is turned off. Consequently, capacitor C1 starts discharging through CdS cell P1, whereby the potential at point A begins to rise.

In case flash device 1 is mounted in connector 3 and the charging of the trigger capacitor in the trigger circuit is completed, the potential at point C reaches a predetermined level, and transistors T3 and T4 are both maintained conductive. Furthermore, the terminal voltage of the trigger capacitor in the trigger circuit is directly impressed onto point G. Under this condition, when the shutter assumes its fully open position and switch S2 is turned on, the capacitor in the trigger circuit is discharged through switch S2 and SCR 4, whereby the flash tube emits flash light. Also, the potential at the positive terminal of capacitor C3 is abruptly lowered, and current flows through resistors R4 and R5, thereby abruptly lowering the potential at point H. As a result, transistor T2 becomes conductive, and hence transistor T4 is rendered conductive, so that the current being discharged from capacitor C1 flows through transistors T2 and T4, whereby the potential at point A is rapidly raised to a predetermined level. Thus, the output level of switching circuit S becomes high, thereby deenergizing electromagnet Mg, whereby the shutter is closed. In short, when the brightness of an object is low and the charging of the capacitor in the trigger circuit in the flash device mounted in connector 2 is completed, then the shutter is closed within a short period of time after the emission of flash light from the flash tube, independently of the brightness of an object.

However, in the case where the brightness of an object is low but the charging of the trigger capacitor in the flash device is not yet completed, or in the case where a camera is used without mounting the flash device in connector 3, the potential at point C does not rise to the predetermined level, and the transistors T3 and T4 therefore remain non-conducting. Accordingly, no current flows through transistors T2 and T4, so that capacitor C1 is discharged only through CdS cell P1. Thus, the exposure time is determined according to the resistance of CdS P1, namely, the brightness of an object.

When the brightness of an object is high enough to take a photograph without firing a flash tube, the potential at point A is raised to a level higher than the predetermined level as shown as potential source switch S0 has been turned on, so that switching circuit S produces a high output level. At this stage, electromagnet Mg remains unexcited, and hence warning lamp L remains unlit. Furthermore, transistors T5 – T6 and SCR 4 remain nonconducting.

When switch S6, with the progress of the shutter release operation, is changed over to contact terminal b, the potential at point A is lowered, and the output level of switching circuit S is lowered. Consequently, electromagnet Mg is excited, and lamp L is lit. At the same time, transistor T5 is made conductive, but transistor T6 remains nonconductive and hence SCR 4 remains nonconductive.

Consequently, it follows that even if the shutter assumes its fully open position and switch S2 is turned on, transistor T2 remains nonconducting, and therefore transistors T2 and T4, which are collector-emitter connected to each other, are maintained nonconducting, irrespective of whether or not the flash device is mounted in the connector and the charged level of the capacitor within the flash device. In this case, discharge of capacitor C1 takes place through CdS cell P1 alone, and the exposure time is determined according to the brightness of an object. As SCR 4 remains nonconductive, flash device 1 is not fired when switch S2 is turned on.

Reference has been made to the two embodiments shown in the drawings, but these embodiments are presented solely for the purpose of describing the invention and not for the purpose of limiting the scope of the invention. Any modification and change may be made within the scope of the claims and without departing from the spirit of the invention. For example, it is possible in the second embodiment that capacitor C1 be connected to series to CdS cell P1 and resistor R1 (as in the manner shown by a dotted line in FIG. 2), so that the exposure time may be determined according to the potential at point A which is raised by the voltage charged by capacitor C1, as in the first embodiment.

What is claimed is:

1. A camera for use with an electronic flash device including a flash tube, said camera comprising:
    brightness detecting means for generating an output commensurate with the brightness of an object;
    level detecting means for detecting the level of the output of said brightness detecting means to generate a low brightness signal only when the brightness of the object is lower than a first predetermined level;
    firing circuit means connected to said level detecting means for conditioning said flash tube to fire in the presence of said low brightness signal;
    timing means connected to said brightness detecting means for integrating a first current commensurate with the output of said brightness detecting means;
    means for initiating the integration of said timing means upon commencement of an exposure;
    a switching circuit for terminating the exposure when the voltage of said timing means reaches a second predetermined level;
    flash preparation detecting means for detecting whether said flash device has been completely prepared for firing said flash tube;
    a current supplying circuit for supplying a second current to said timing means, and including a first and a second switching means and actuated with both of said first and second switching means being conductive, said first switching means being connected to said level detecting means to be conditioned to be conductive in the presence of said low brightness level signal and said second switching means being connected to said flash preparation detecting means to be conditioned to be conductive upon detection of completion of the preparation of said flash device for firing said flash tube, and said second current causing the voltage of said timing means to reach said second predetermined level sooner than with only said first current supplied to said timing means; and
    trigger means responsive to the initiation of exposure for actuating said firing circuit and for initiating conduction of said first and second switching means.

2. A camera as in claim 1, wherein said first and second switching means are connected in series to one another.

3. A camera as defined in claim 2, wherein said timing means includes a timing capacitor and said current supplying circuit forms a circuit for charging said timing capacitor with said second current, and said brightness detecting means is connected to said timing capacitor to charge the latter with said first current upon actuation of said means for initiating the integration of said timing means.

4. A camera as defined in claim 2, wherein said timing means includes a timing capacitor and said current supplying circuit forms a circuit for discharging said timing capacitor with said second current, and said brightness detecting means is connected to said timing capacitor to discharge the latter with said first current upon actuation of said means for initiating the integration of said timing means.

5. A camera as defined in claim 2, wherein said flash device includes a main capacitor for firing said flash tube and a trigger circuit having a trigger capacitor connected to said main capacitor so as to be charged to a voltage level corresponding to that of said main capacitor, said trigger capacitor being connected to said firing circuit so as to be discharged for initiating the firing of said flash tube through said firing circuit when said firing circuit is actuated, and wherein said flashing preparation detecting means includes a detecting circuit for detecting the voltage across said trigger capacitor.

6. A camera as defined in claim 5, wherein said firing circuit includes a switching element connected to said level detecting means and said trigger means so as to be made conductive upon the exposure and in the presence of said low brightness signal, said firing circuit discharging said trigger capacitor when said switching element is made conductive.

7. A camera as defined in claim 6, wherein said brightness detecting means includes first and second light responsive elements which respectively generate the output thereof, said level detecting means being connected to said first light responsive element to receive the output of the latter, said first switching means being connected to said switching element so as to be made conductive when said switching element is made conductive, and said second light responsive element and said current supplying circuit being connected to said timing capacitor to respectively supply said first and second currents to said timing capacitor.

8. A camera as defined in claim 6, wherein said brightness detecting means includes a single light responsive element which generates the output thereof, said level detecting means being connected to said light responsive element to receive said output, said first switching means being connected to said switching element so as to be made conductive when said switching element is made conductive, and said timing capacitor being connected to said light responsive element and said current supplying circuit so as to be supplied with said first and second currents, and said camera further comprising means for preventing the voltage across said timing capacitor from being impressed on said switching circuit prior to the exposure.

9. A camera as defined in claim 6, wherein said switching element is a silicon controlled rectifier.

* * * * *